(12) United States Patent
Karadkhelkar et al.

(10) Patent No.: US 12,536,537 B2
(45) Date of Patent: Jan. 27, 2026

(54) SYSTEMS AND METHODS FOR TRANSACTION AUTHORIZATION

(71) Applicant: Comcast Cable Communications, LLC, Philadelphia, PA (US)

(72) Inventors: Govind Karadkhelkar, Malvern, PA (US); David Burmester, New Hope, PA (US); Kohposh Kuda, Houston, TX (US); Swaraj Rajeev, Parker, CO (US); Joel Rieck, Parker, CO (US); Ramesh Bheemappa, Highlands Ranch, CO (US); Ramu Vemula, Englewood, CO (US); Nicholas Andris, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 560 days.

(21) Appl. No.: 17/929,620

(22) Filed: Sep. 2, 2022

(65) Prior Publication Data
US 2024/0078549 A1  Mar. 7, 2024

(51) Int. Cl.
*G06Q 20/40* (2012.01)
*G06Q 20/20* (2012.01)

(52) U.S. Cl.
CPC ....... *G06Q 20/4014* (2013.01); *G06Q 20/208* (2013.01)

(58) Field of Classification Search
CPC ............. G06Q 20/4014; G06Q 20/208; G06Q 30/015; G06Q 30/06; G06Q 30/0623
USPC .......................................................... 705/23
See application file for complete search history.

(56) References Cited

U.S. PATENT DOCUMENTS

| 11,392,900 | B2 * | 7/2022 | Benkreira ............. H04L 51/212 |
| 2011/0145051 | A1 * | 6/2011 | Paradise ............ G06Q 30/0601 |
| | | | 705/26.7 |
| 2021/0125255 | A1 * | 4/2021 | Ramakrishnan ....... G06N 20/00 |
| 2021/0125270 | A1 * | 4/2021 | Ramakrishnan ....... G06Q 30/04 |

FOREIGN PATENT DOCUMENTS

EP 3846393 A1 * 7/2021 ....... G06F 16/90328

* cited by examiner

*Primary Examiner* — Garcia Ade
(74) *Attorney, Agent, or Firm* — BakerHostetler (57) ABSTRACT

A pre-purchase serviceability check may be provided to confirm serviceability of a product by a user prior to the purchase of the product. A message may be received by a server and from a user device. The message may comprise information indicative of a user associated with the user device and a first identifier associated with a product. The server may determine, based on one or more of the information indicative of the user or the first identifier, that the product is usable by the user. The server may associate, for a first period of time, the first identifier with a second identifier associated with the product. The server may receive, from a point of sale device, a request comprising the second identifier. The server may determine a time associated with the request from the point of sale device is within the first period of time. The server may send, to the point of sale device, a second message comprising an indication of the time being within the first period of time and an indication that the product is usable by the user.

20 Claims, 6 Drawing Sheets

SYSTEMS AND METHODS FOR TRANSACTION AUTHORIZATION

BACKGROUND

Products with certain restrictions may be offered for sale in third-party establishments, such as a retail store. Purchasers of a restricted product should determine prior to purchasing the product whether the purchaser may use the restricted product. The manufacturer of the product may retain records of the restrictions on the product. Prior to purchasing the product, the purchaser can request confirmation that it will be able to use the product. Improvements in conducting the pre-purchase checks in an efficient manner are needed.

SUMMARY

Systems, methods, and apparatus are described herein for providing pre-purchase serviceability checks for products offered for sale at a third party establishment. A server may receive a first request associated with a product for sale at the third party establishment. The first request may comprise one or more of an identifier associated with a user of a user device sending the request, an address associated with the user, and an identifier associated with the product. The server may determine, based on one or more of the identifier associated with the user or the address, that the user may use the product. The server may associate the user with the product for a first period of time. The server may receive, from a point of sale device associated with the third party establishment, a second request associated with the product identifier. The server may send a response to the second request indicating the user is associated with the product.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of the disclosure.

BRIEF DESCRIPTION OF THE DRAWINGS

Aspects of the disclosure will now be described in detail with reference to the drawings, wherein like reference numbers refer to like elements throughout, unless specified otherwise.

DETAILED DESCRIPTION

In order to provide restricted products to a user without prior knowledge of the user's credentials, a service may perform one or more serviceability checks to determine whether the user may use the product prior to the user purchasing the product from a third party location. For example, if a user attempts to purchase a home internet starter kit at a store, the user may not know whether the specific internet service provider associated with the home service kit operates at the user's home. In a traditional system, the user may purchase the restricted product, take the product home, and determine that the product is unavailable for use by the user. For example, the user may not live in an area associated with the restricted product. So, a system that allows a user to determine whether a product is available to the user prior to purchase is desirable. In addition, it is desirable to simplify the user experience in connection with such a pre-purchase serviceability check.

Disclosed herein are systems, apparatuses, and methods for pre-purchase serviceability checks and authorization associated with products for sale at a third party retail establishment location. A product for sale may be presented at a third party retail establishment location. One or more serviceability checks may be performed to allow a user to determine whether the user may use the product at a location associated with the user, such as, for example, the user's home or business location. Additionally, a specific instance of the product may be associated with the user after the user performs the serviceability check and before the user purchases the product at a point-of-sale within the third party retail establishment location. A dynamic identifier may be employed to facilitate performing the serviceability check and purchase, while also allowing the system to uniquely identify the user and the specific instance of the product simultaneously.

For example, a company may provide products associated with the company for sale at a third party retail establishment. For example, the company may be an Internet Service Provider (ISP), and the product may be a product associated with accessing services offered by the ISP. For example, the product may be a gateway device. The gateway device may be usable by a user to access broadband internet through the ISP. However, not all products sold by all companies are universally usable. For example, ISP's may not be able to provide broadband internet service to every single person for one or more reasons. ISP's may not be able to provide broadband internet coverage for certain geographic areas, for example. Therefore, users, purchasing products at a third party retail establishment, should be able to determine whether the product is serviceable at the users' desired locations, such as personal residences, business locations, or the like. Thus, presenting a method for checking the serviceability of the product prior to purchase at the third party location is desirable. For example, a user may wish to check whether the product, for example the gateway device, is usable at a user's residence to access broadband internet or other services provided by the ISP.

Figure 1:
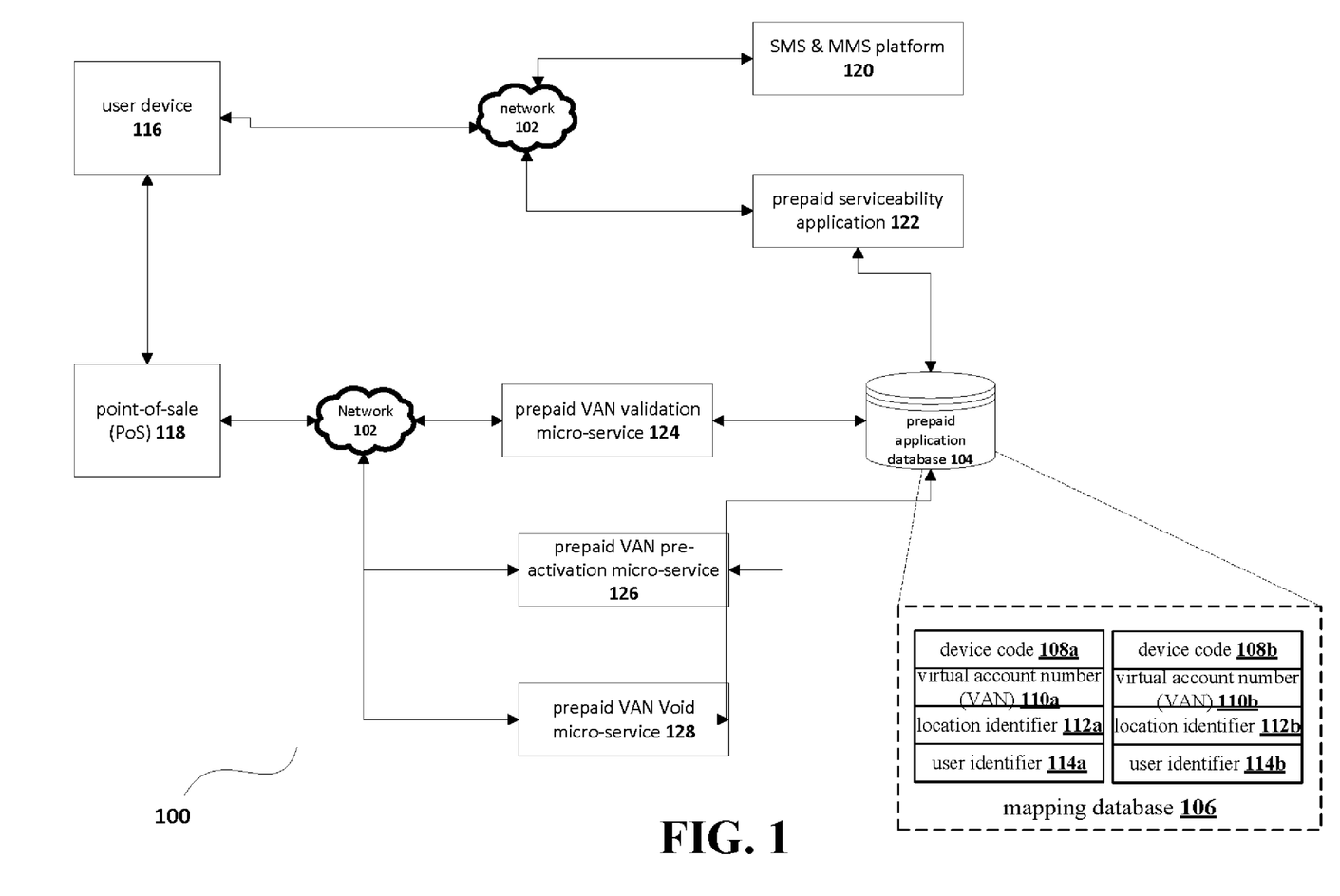
FIG. 1 shows an example system.

FIG. 1 shows an example system in which the systems, methods, and apparatuses disclosed herein may be implemented. As shown in FIG. 1, a system 100 may comprise at least one database 104. The database 104 may comprise a prepaid service database 104. For example, the prepaid service database 104 may be configured to store indications associated with one or more products and may be configured to store indications associated with one or more users. The prepaid application database 104 may comprise a database 106, referred to herein as a mapping database 106, that provides a mapping of, or otherwise indicates, association(s) between the one or more products and the one or more users.

The system 100 may further comprise a user device 116 and a point-of-sale device and/or system 118. The user device 116 may be configured to communicate with the prepaid service database 104 via a communications network, such as network 102. The prepaid service database 104 may be configured to communicate with the user device 116 and the point-of-sale device 118 via the network 102. The network 102 may comprise one or more of an internet service provider (ISP) network, a cloud computing network, a local area network (LAN), a Wi-Fi network, a wide area network (WAN), a satellite network, the internet, or any combination thereof. The network 102 may facilitate communication among multiple entities, including the prepaid service database 104, the user device 116, and the point-of-sale device 118. The user device 116 and the point of sale 118 may transmit and/or receive content via the network 102. Such content may comprise, as non-limiting examples, video data, audio data, text data, user credentials, product identifiers, or the like.

The user device 116 may comprise, as non-limiting examples, a computer, a laptop, a tablet, a mobile phone, a personal digital assistant (PDA), or the like. The point of sale 118 may comprise a device such as a barcode scanner, a computing device, a cash register, a receipt printer, a payment card reader, such as a credit card reader, or the like. The point of sale device 118 may be configured to scan, using, for example, a barcode scanner, a barcode associated with a product. Additionally, or alternatively, the barcode scanner may be configured to scan a barcode presented on a user device 116.

The point-of-sale device 118 may be located at one of one or more retail establishments, such as one or more stores. The one or more retail establishments may be operated by a different entity than the operator of the prepaid service database 104. The operator of the prepaid service database 104 may be an entity that provides products that are sold at the one or more retail establishments. The point of sale device 118 may be configured to scan a single barcode associated with a product offered for sale in order to complete a sale of the product at the retail establishment. The point of sale device 118 may be configured to scan multiple barcodes associated with a product to complete a sale of the product at the retail establishment.

The prepaid application database 104 may receive a message from the user device 116. The message may comprise a request to perform a serviceability check for a product offered for sale at the retail establishment in order to determine whether the product associated with the product identifier is capable of being used by a user of the user device 116 at a location associated with the user, such as the user's home or business. The message may comprise one or more of a user identifier, a user address, a product identifier, and/or other information associated with a potential purchase transaction involving the product. The prepaid application database 104 may store one or more of the pieces of information received from the user device 116 in the mapping database 106.

The mapping database 106 may store one or more device codes 108. The one or more device codes 108 may comprise indications of identifiers of individual products offered for sale. The one or more device codes 108 may be mapped to one or more individual products offered for sale. The one or more device codes 108 may be disassociated with the individual products offered for sale and re-associated with additional individual products offered for sale. The mapping database 106 may store one or more virtual account numbers 110 associated with an individual product located at a retail establishment location. The one or more virtual account numbers 110 may be stored in the mapping database 106 independent of the request, and the request may comprise an indication of one or more virtual account numbers 110 that may be compared against the stored one or more virtual account numbers 110. The mapping database 106 may store one or more location identifiers 112. The one or more location identifiers 112 may comprise one or more addresses of a user associated with the user device 116. The one or more addresses may comprise a home address associated with the user. The one or more addresses may comprise a business address associated with the user. The mapping database 106 may store one or more user identifiers 114. The user identifier 114 may store one or more identifiers associated with a user associated with the user device 116. The one or more user identifiers 114 may comprise a phone number associated with the user device 116.

The mapping database 106 may associate one or more device codes 108, virtual account numbers 110, location identifiers 112, and user identifiers 114. For example, a single device code 108a, a single virtual account identifier 110a, a single location identifier 112a, and a single user identifier 114a may be associated with one another in the mapping database 106. Additionally, device code 108a, virtual account identifier 110a, location identifier 112a, and user identifier 114a may be associated with a single user device 116a. Alternatively, the mapping database 106 may associate more than one device code 108, virtual account number 110, location identifier 112, and user identifier 114 with one user device 116.

Figure 2:
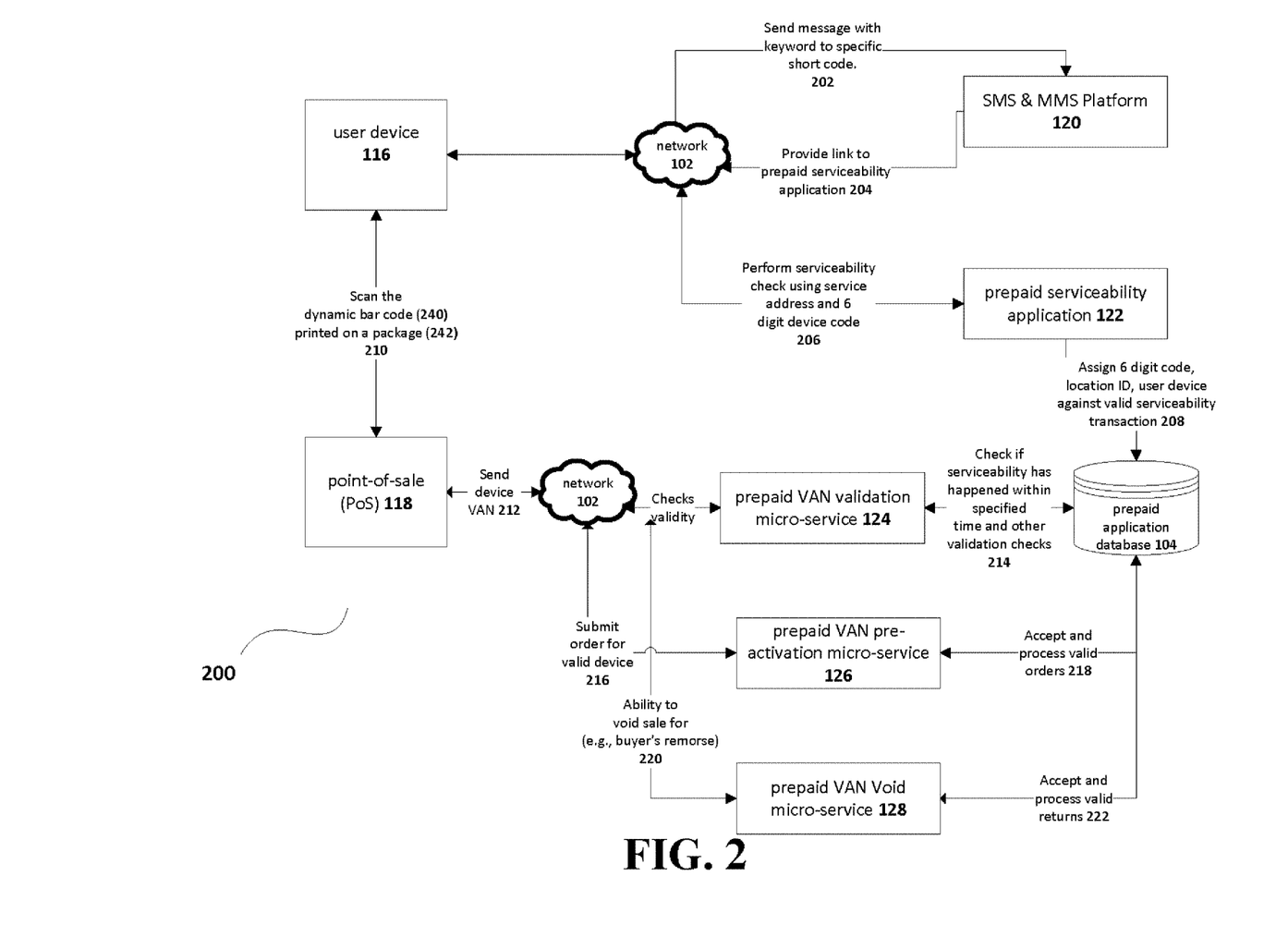
FIG. 2 shows an example method.

FIG. 2 shows an example method 200. The example method may be implemented, for example, in the system of FIG. 1. The method 200 may be used to facilitate a pre-purchase serviceability check and authorization for purchase of a product. For example, a user may perform a serviceability check at a retail establishment to determine whether the product is available for use by the user. For example, a home internet starter kit may be unavailable for use in some locations. The home internet starter kit may only be available in geographic locations associated with internet service provided by an internet service provider (ISP). For example, the home internet starter kit may be unavailable in a geographic area outside the ISP's service area. Accordingly, the serviceability check may determine that a user device 116 associated with the serviceability check is associated with a geographic area outside of a service area of the ISP associated with the home internet starter kit. Alternatively, a pre-purchase serviceability check may determine that a user device 116 is unable to use a product associated with the serviceability check for any other reason. Non-limiting examples include the user device 116 is associated with a specific address or building outside a service area, a product associated with the serviceability check is already associated with a different user device 116b, the product associated with the serviceability check is unavailable for purchase, or the like.

The product may be presented for purchase at the retail establishment in the form of a box, carton, or other package that a customer may be able to pick up and carry to a point-of-sale location at the retail establishment. The package 242 may comprise a barcode 240. The barcode 240 may be affixed to the package. The barcode 240 may be a static barcode. For example, the barcode 240 may be a same barcode 240 for each package 242 associated with a same product. For example, a retail establishment may place 10 packages 242 for sale at the retail establishment, and a single barcode 240a may be associated with each package of the 10 packages 242. The barcode 240 may be a dynamic barcode. For example, the barcode 240 may be a different barcode 240 for each package 242 associated with a same product. A retail establishment may place 10 packages 242 for sale at the retail establishment, and each package 242 may be associated with a different dynamic barcode 240. The dynamic barcode 240 may uniquely identify an individual product. The dynamic barcode 240 may be a pseudo-unique identifier of an individual product. Additionally, each dynamic barcode may comprise multiple parts. For example, a first part of the barcode 240 may identify the type of product associated with the barcode 240. A second part of the barcode 240 may identify an individual product of the type of product. For example, the first part of the barcode 240 may be the same on each package of 10 packages 242 displayed at a retail establishment. However, the second part of the barcode 242 may be different for each package of the 10 packages 242 displayed at the retail establishment.

The package 242 may also be associated with an alphanumeric keyword 244. For example, the keyword 244 may be an alphanumeric code. The alphanumeric code keyword 244 may be associated with an individual package 242. For example, 10 packages 242 may be displayed for sale at a retail establishment, and each package of the 10 packages 242 may be associated with a different keyword 244. Each keyword 244 may be associated with a short code. For example, an instruction may be presented on a first package 242 instructing a user to send a first keyword 244 associated with the first package 242 to a short code. The short code may be a unique short code associated with an individual keyword 244, or the short code may be associated with multiple, or all, of the keywords 244 associated with a type of product.

A package 242 of a product may be displayed for sale. A user, such as user 202, may determine to purchase the product and may select (e.g., pick up) one of the packages 242 of the product to carry to a point-of-sale location at the retail establishment. The user 202 may use a user device, such as user device 116 to send a message 202 to a short code associated with the package 242, wherein the message comprises a keyword 244 associated with the package 242. The message 202 sent to the short code may be sent to a short message service (SMS) and/or multimedia message service (MMS) platform 120 designed for processing short codes. The SMS/MMS platform 120 may store a list of keywords 244 and short codes associated with one another. The SMS/MMS platform 120 may determine the received keyword 244 matches the received short code. Based on the keyword 244 matching the short code, the SMS/MMS platform 120 may send a link to the user device 116. The link may be associated with a serviceability check 206. The link may be a uniform resource locator (URL) of the serviceability application. The user device may use a hypertext transfer protocol (HTTP) to communicate with the serviceability application to initiate a serviceability check.

The user device 116 may receive the link to the serviceability check 206. The user device 116 may activate and/or proceed with the serviceability check 206 to determine whether the user will be able to use the product at a location associated with the user, such as the user's home or business location. The user may, as part of the serviceability check, provide one or more of a device code 108, a location identifier 112 associated with an address associated with the user device 116, and a user identifier 114. For example, the device code 108 may be associated with the keyword 244. The device code 108 may comprise the keyword 244. The device code 108 may comprise a six-digit alphanumeric code. The device code 108 may comprise a six-digit number. The device code 108 may be shorter or longer than six-digits and may comprise any number of integers, letters, and symbols. The location identifier 112 may be associated with a location of the user device 116. The location identifier 112 may be associated with a location associated with a user associated with the user device 116. The location identifier 112 may comprise an address associated with a residence or a business location of the user. The user identifier 114 may be associated with a unique identifier of the user device 116. The user identifier 114 may be associated with a unique identifier of the user. The user identifier 114 may comprise a phone number associated with the user device 116. As part of the serviceability check, the user device 116 may send the device code 108, the location identifier 112, and the user identifier 114 to a serviceability application 122 associated with the product.

The serviceability application 122 may determine that the device code 108, the location identifier 112, and the user identifier 114 are valid. A determination that the device code, the location identifier, and the user identifier are valid comprises a determination that the user associated with the user identifier will be able to use the product associated with the device code at the user location associated with the location identifier. For example, the system may allow a particular user or user device associated with the user identifier 114 to use a specified number of copies of the product. For example, a particular user or user device associated with the user identifier 114 may be allowed to use a single copy of the product. The serviceability application 122 may determine that the user identifier 114 is not associated with additional copies of the product, and the serviceability application 122 may determine the user identifier 114 associated with the serviceability check 206 is valid. The particular user or user device associated with the user identifier 114 may be allowed to use any number of copies of the product at the same time or at different times. For example, a user or user device associated with the user identifier 114 may be allowed to use multiple copies of the product simultaneously, multiple copies of the product at different times, or the like.

The serviceability application 122 may determine that the device code 108, the location identifier 112, and the user identifier 114 are invalid. A determination that the device code, the location identifier, and the user identifier are invalid comprises a determination that the user associated with the user identifier will not be able to use the product associated with the device code at the user location associated with the location identifier. For example, the system may allow a particular user or user device associated with the user identifier 114 to use a specified number of copies of the product. For example, a particular user or user device associated with the user identifier 114 may be allowed to use a single copy of the product. The serviceability application 122 may determine that the user identifier 114 is associated with at least one additional copy of the product, and the serviceability application 122 may determine the user identifier 114 associated with the serviceability check 206 is invalid.

The serviceability application 122 may send an indication of the validity or invalidity of the serviceability check to a prepaid application database 104. The prepaid application database 104 may store the indication of the validity or the indication of the invalidity. The prepaid application database 104 may, in response to determining the serviceability check is valid, store an indication of the device code 108, the location identifier 112, the user identifier 114, and a virtual account number 110 associated with the product. The virtual account number 110 may comprise an alphanumeric sequence used to uniquely identify an item. For example, the virtual account number 110 may uniquely identify a product associated with a unique package 242. Each package 242 may be associated with a unique virtual account number 110. The prepaid application database 104 may store the indication of the device code 108, the location identifier 112, the user identifier 114, and a virtual account number 110 for a first period of time. For example, the first period of time may comprise one hour, two hours, four hours, 30 minutes, 45 minutes, 24 hours, 48 hours, or the like. The validity of the serviceability check may be valid for the first period of time.

Based on determining a valid serviceability check, the serviceability application 122 may send, to the user device 116, an indication of the valid serviceability check 206. The indication may further indicate the first period of time. The user device 116 may have up to an amount of time equal to the first period of time to complete a purchase. Attempting to complete the purchase outside of the first period of time may cause a failure of the purchase. Upon leaving the first period of time, the user device 116 may have to re-initiate the serviceability check and proceed to a second valid serviceability check to proceed with the purchase.

While the serviceability check is valid, the user device 116 may be used to initiate a purchase of the product identified during the serviceability check. The product may be presented at a retail establishment point of sale (PoS) 118. The PoS 118 may comprise a barcode scanner. The PoS may, using the barcode scanner, scan a barcode 240 on a package 242 associated with the product. Upon scanning the dynamic barcode 240, the PoS 118 may determine a first portion of the dynamic barcode 240 associated with a sales system associated with the PoS 118. For example, the first portion of the dynamic barcode 240 may be associated with a stock-keeping unit (SKU) associated with the sales system associated with the PoS 118. The PoS 118 may determine a second portion of the dynamic barcode 240 associated with the product and associated with the prepaid application database 104. The second portion of the dynamic barcode 240 may comprise a virtual account number (VAN) 110 associated with the product. At step 212, the PoS may transmit, via the network 102, the VAN 110 to a VAN validation micro-service 124. The VAN validation micro-service 124 may determine whether the VAN 110 is valid. For example, the VAN validation micro-service 124 may determine whether the VAN 110 comprises a recognized VAN 110. At step 214, the VAN validation micro-service 124 may transmit a message to the prepaid application database 104 to determine whether the VAN 110 received from the PoS 118 is valid. The VAN validation micro-service 124 may receive a message indicating that the VAN 110 is associated with a valid serviceability check. The VAN validation micro-service 124 may receive a message indicating that the VAN 110 is associated with an invalid serviceability check. For example, the VAN 110 may be received from the PoS 118 during the first time period, and the VAN 110 may be determined valid. In another example, the VAN 110 may be received from the PoS 118 outside the first time period, and the VAN 110 may be determined invalid. The VAN validation micro-service 124 may transmit an indication, via the Network 102, to the PoS 118. The PoS 118 may receive an indication that the serviceability check is invalid, and the PoS 118 may deny the transaction. The PoS 118 may receive an indication that the serviceability check is valid, and the PoS 118 may approve the transaction.

The PoS 118 may, based on approving the transaction, process the transaction. At step 216, the PoS 118 may submit the transaction of the product associated with the user device 116 to a VAN pre-activation micro-service 126. At step 218, the VAN pre-activation micro-service 126 may transmit an indication, to the prepaid application database 104, associated with the completed transaction of the product associated with the user device 116. The prepaid application database 104 may store an indication of the completed transaction, and the prepaid application database 104 may store an indication that the user device 116 is associated with a completed purchase and transaction of the product. At step 218, the prepaid application database 104 may transmit, to the VAN pre-activation micro-service 126 the indication that the completed purchase and transaction is stored in the prepaid application database 104. At step 216, the VAN pre-activation micro-service 126 may transmit, to the PoS 118, an indication of the completed purchase and transaction.

The user device 116 may follow some or all of the steps above to complete a purchase of a product at a retail establishment. However, in some cases, a user associated with the user device 116 may wish to return the product and void the purchase. For example, the address associated with the user may lose service from the ISP associated with the product, the user may move to an area outside of the ISP's service range, the user may gain access to internet in an alternative means, the user may wish to obtain a refund of money spent to purchase the product, or the like. In the event the user wishes to return the product and void the sale, the user may return the product to the PoS 118 associated with the transaction, or the user may return the product to a retail establishment with a PoS 118 configured to operate with the serviceability check. At step 220, the PoS 118 may transmit a message to a VAN Void micro-service, wherein the message comprises an indication of the product purchase associated with the user device 116. At step 222, the VAN void micro-service may transmit a message to the prepaid application database 104 indicating the information associated with voiding the sale of the product. The prepaid application database 104 may store an indication that the product and the user device 116 are no longer associated with a valid serviceability check. The prepaid application database 104 may transmit a message to the VAN void micro-service 128 indicating the storage of the void transaction. At step 220, the VAN void micro-service 128 may transmit, to the PoS 118 an indication of the void transaction.

The method described in FIG. 2 may be performed using a single request from the point-of-sale system. The point-of-sale system may complete a single scan of the dynamic barcode 240 and the prepaid application database 104 may determine whether the user device 116 is allowed to complete the purchase of the product. The dynamic barcode and pre-purchase serviceability check and validation may reduce the amount of interaction required between a user associated with the user device and the point-of-sale system. Thus, the present system minimizes the amount of time and effort spent completing the purchase at the point-of-sale. Additionally, the single-scan method minimizes the burden on the point-of-sale system because the point-of-sale system simply completes one scan and receives an indication of the validity of the purchase. Requiring multiple scans from the point-of-sale system may be cumbersome, or multiple scans may not be feasible for some point-of-sale systems.

The method described in FIG. 2 may describe a method for purchasing a gateway device associated with an ISP. The gateway device may be used to access broadband internet provided by the ISP, as well as additional services offered by the ISP. The user may return to a location associated with the serviceability check with the product, for example the gateway device, and the user may attempt to access the services offered via the gateway device. To do so, the user may be required to activate the gateway device to access the services. The pre-purchase serviceability check may assist with, or reduce the complexity of, the activation of the gateway device for accessing broadband internet or other services offered by the ISP.

To access the broadband internet or other services, the user may connect the gateway device to a power source located at the location associated with the successful serviceability check. Though the gateway device may power on, the gateway device may be unable to provide access to any services without undergoing an activation process. To begin the activation process, the user may navigate to an address, such as a uniform resource locator (URL), provided with the gateway device. For example, the URL may be printed on the outside of the product packaging, on the inside of the product packaging, on an insert within the product packaging, on the gateway device, or any other suitable location. Additionally, the user may request, via a short message service (SMS) message. The user may send an SMS message to a number printed on the outside of the product packaging, printed on the inside of the product packaging, printed on an insert within the product packaging, printed on the gateway device, or any other suitable location. Upon sending an SMS message to the number, the user may receive a return SMS message with a URL link to the activation process.

The user may navigate to the URL and begin the activation process. The user may provide any number of items of information. For example, the user may provide one or more of a device code 108, a VAN 110, a location identifier 112, or a user identifier 114 associated with the user and/or associated with the serviceability check. The user may provide a phone number associated with the user's user device, a zip code or full street address associated with the user's location, the user's name, the user's email address, a MAC address associated with the gateway device, or any other suitable information. The system may determine a successful serviceability check was performed for the gateway device and the user's location, and the system may determine the activation is successful based on one or more of the pieces of information provided during the activation process.

Figure 3:
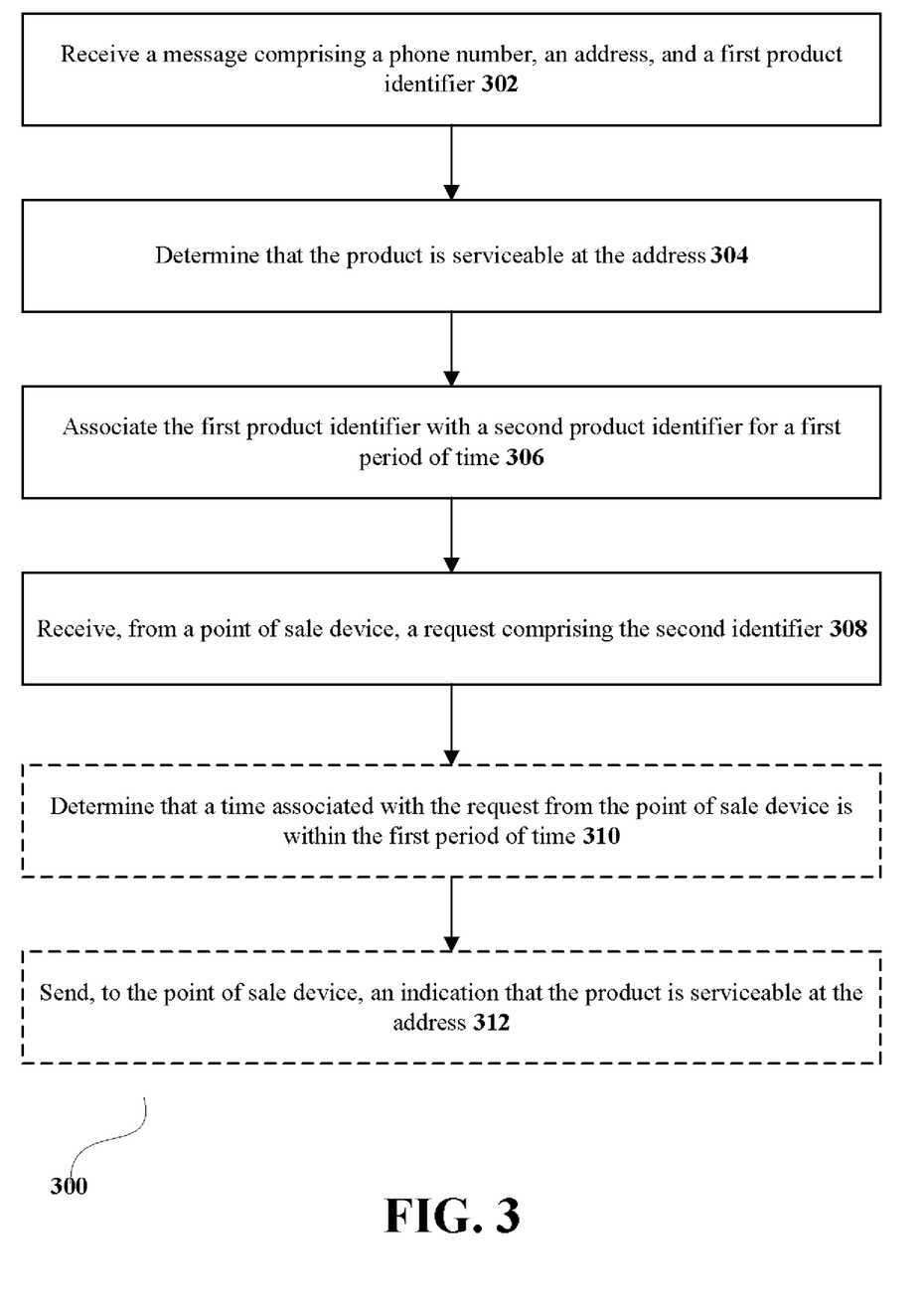
FIG. 3 shows an example method.

FIG. 3 shows an example method. The method of FIG. 3 may be used to process a pre-purchase serviceability check and authorization to purchase a product. The method of FIG. 3 may take place at least in part at a retail establishment. The method of FIG. 3 may take place at least in part at a central computing device monitoring pre-purchase serviceability checks and transactions. The method of FIG. 3 may take place at least in part using a point of sale system associated with a third party entity, such as a third party retail establishment. At step 302, a computing device may receive a message comprising at least one of a phone number, an address, and a first product identifier. The phone number may be associated with a user device. The phone number may be associated with a user. The address may be associated with a residence or a business location of the user. The address may be associated with the user device. The first product identifier may be associated with the product. The first product identifier may comprise a six-digit number. The first product identifier may comprise a six-digit alphanumeric sequence. The first product identifier may be longer or shorter than six-digits. The first product identifier may comprise any unique or pseudo-unique sequence. Based on receiving the phone number, the address, and the first device identifier, a system may determine a request to perform a serviceability check. For example, the message may be associated with a user device or a user requesting a serviceability check prior to purchasing a product. The product may have a restriction. For example, the product may comprise a pre-packaged home internet kit, or the product may comprise a home internet installation kit. A user may acquire the product at a third party retail establishment, such as a retail establishment, and the user may take the product to a location associated with the user, such as a user address. The user may interact with the product outside of the third party location, such as the retail establishment. However, the user may request whether the product is serviceable at the location associated with the user. For example, the user may request whether the home internet starter kit is serviceable at the user's home.

At step 304, the system may determine whether the product is serviceable at the address indicated in the message. For example, the product may comprise a home internet starter kit. The system may determine whether internet associated with an Internet Service Provider associated with the home internet starter kit services an area associated with the address in the message. The system may determine the address is invalid. For example, the system may determine the address is outside a geographic area associated with the product. For example, the system may determine the address is outside a geographic area associated with a service area of an internet service provider (ISP). The system may determine the address is valid. For example, the product may comprise a home internet starter kit and the system may determine the address is associated with a geographic location associated with the home internet starter kit. For example, the address may be associated with a geographic area associated with a service area of an ISP associated with the home internet starter kit.

The address may indicate a location that is associated with a different ISP. For example, a specific building may be associated solely, or partially, with a first ISP. The product may be associated with a second ISP. The system may determine, based on the address being associated with the first ISP, a lack of serviceability at the address.

The system may determine that the phone number associated with the message is valid. The system may determine the product is serviceable with a phone number associated with the message. For example, the system may determine the phone number comprises an area code associated with a geographic area serviceable in relation to the product. The system may determine the product is invalid regarding the phone number. For example, the product may determine the phone number comprises an area code associated with a geographic area outside a serviceability area associated with the product. The system may determine the product is serviceable at the address and proceed to the next step in the serviceability check.

At step 306, a first product identifier may be determined. For example, the first product identifier may comprise a six-digit numeric sequence. The first product identifier may comprise a six-digit alphanumeric sequence. The first product identifier may be shorter or longer than six digits. The first product identifier may be unique. The first product identifier may be pseudo-unique. For example, the first product identifier may be associated with a first product at a first time, and the first product identifier may be associated with a second product at a second time. For example, the first product identifier may be associated with a first product and the first product may be offered for sale. The first product may be purchased. The first product identifier may be disassociated, based at least in part on the purchase, from the first product. A second product may be offered for sale at a second time, the second time different than the first time. The second product may be associated, during the second time, with the first product identifier. Overall, the first product identifier may be associated with a plurality of products at a plurality of times, wherein the first product identifier may be associated with an individual product at any one time. Thus, the first product may be used multiple times. The first product identifier may comprise a short sequence, such as a six-digit sequence. Thus, the system may be able to use short sequences without running out of short sequence product identifiers because the sequences may be reused from one individual product to another.

The first product identifier may be associated with an individual product offered for sale. For example, the first product identifier may be printed on a package associated with the product. The first product identifier may be printed on a product itself. The first product identifier may be, as non-limiting examples, a QR code, a barcode, a numeric sequence, an alphanumeric sequence, a series of letters, or the like. The first product identifier may comprise any pseudo-unique or unique identifier. The system may receive the first product identifier. The system may associate the first product identifier with a second product identifier. The system may associate the first product identifier with the second product identifier for a first period of time. The first period of time may comprise a set period of time, or the first period of time may comprise a variable period of time. The first period of time may comprise a period of two hours, one hour, four hours, 30 minutes, 45 minutes, 15 minutes, 8 hours, 24 hours, or the like.

The second product identifier may comprise a virtual account number. The second product identifier may be associated with an individual product. The second product identifier may be unique. For example, the second product identifier may comprise a 19-digit virtual account number. The second product identifier may comprise a 19-digit numeric sequence. The second product identifier may comprise a 19-digit alphanumeric sequence. The second product identifier may be longer or shorter than 19 digits. The second product identifier may be associated with a unique product. For example, 10 packages of a type of product may be displayed for sale, and each package of the type of product may be associated with a unique virtual account number. The second product identifier may be printed on a package associated with a product. The second product identifier may be printed on a product. The second product identifier may comprise a barcode. The second product identifier may comprise a portion of a barcode printed on a package of a product. A central computing device may monitor for serviceability checks associated with any number of products. The central computing device may comprise a database. The database may store indications associated with a plurality of virtual account numbers, including the second product identifier. Each one of the plurality of virtual account numbers may be unique, and each one of the plurality of virtual account numbers may be associated with an individual product.

The system may, in response to determining the product is serviceable at the address, may associate the first product identifier with the second product identifier for a first period of time. For example, the database may store an indication for the first period of time that the first product identifier and the second product identifier are associated with one another. Additionally, the database may store an indication that the second product identifier and the user address are associated with one another for the first period of time. The database may store an indication that the second product identifier and the phone number are associated with one another for the first time period. The database may store an indication that the second product identifier is associated with the user address, the phone number, and the first product identifier.

At step 308, the system may receive, from a point of sale device, a request comprising the second product identifier. For example, the point of sale device may send a request indicating a pending transaction and the second product identifier. The system may receive a request from the point of sale device indicating one or more of the user address and the phone number in addition to the second product identifier. The system may search the database for the second product identifier. The system may determine an indication of the second product identifier in the database, and the system may determine the second product identifier is associated with at least one of the phone number, the user address, or the first product identifier. The system may determine a validity of a serviceability check associated with the second product identifier.

At step 310, the system may determine a time associated with receiving the request from the point of sale device. Additionally, the system may determine the indication of the second product identifier stored in the database and may determine the second product identifier associated with at least one of the phone number, the address, or the first product identifier. The system may determine that a time of receiving the request from the point of sale device is within the first period of time associated with the second product identifier. Accordingly, the system may determine the serviceability check is valid during the first time period. Thus, the request received from the point of sale device may be valid.

The system may receive the request from the point of sale device outside the first period of time. The system may determine the first product identifier is associated with the second product identifier for the first period of time and, based on the determination that the request received from the point of sale device is outside the first period of time, the system may determine the first product identifier and the second product identifier are disassociated with one another. Based on a determination that the first product identifier and the second product identifier are disassociated, the system may determine that the request comprising the second product identifier from the point of sale device is invalid.

At step 312 the system may send, to the point of sale device, an indication that the product is serviceable at the address. The system may send, to the point of sale device, an indication that a user associated with the serviceability check is authorized to purchase the product. For example, the system may determine that a user associated with the user address or the phone number is authorized to purchase the product.

The system may, in response to determining the request from the point of sale device is outside the first period of time, determine the request from the point of sale device is invalid. The system may send, to the point of sale device, an indication that the product is not serviceable at the address. The system may send an indication to the point of sale device indicating that a user associated with the address or associated with a purchase of the product is unauthorized to complete the purchase.

Figure 4:
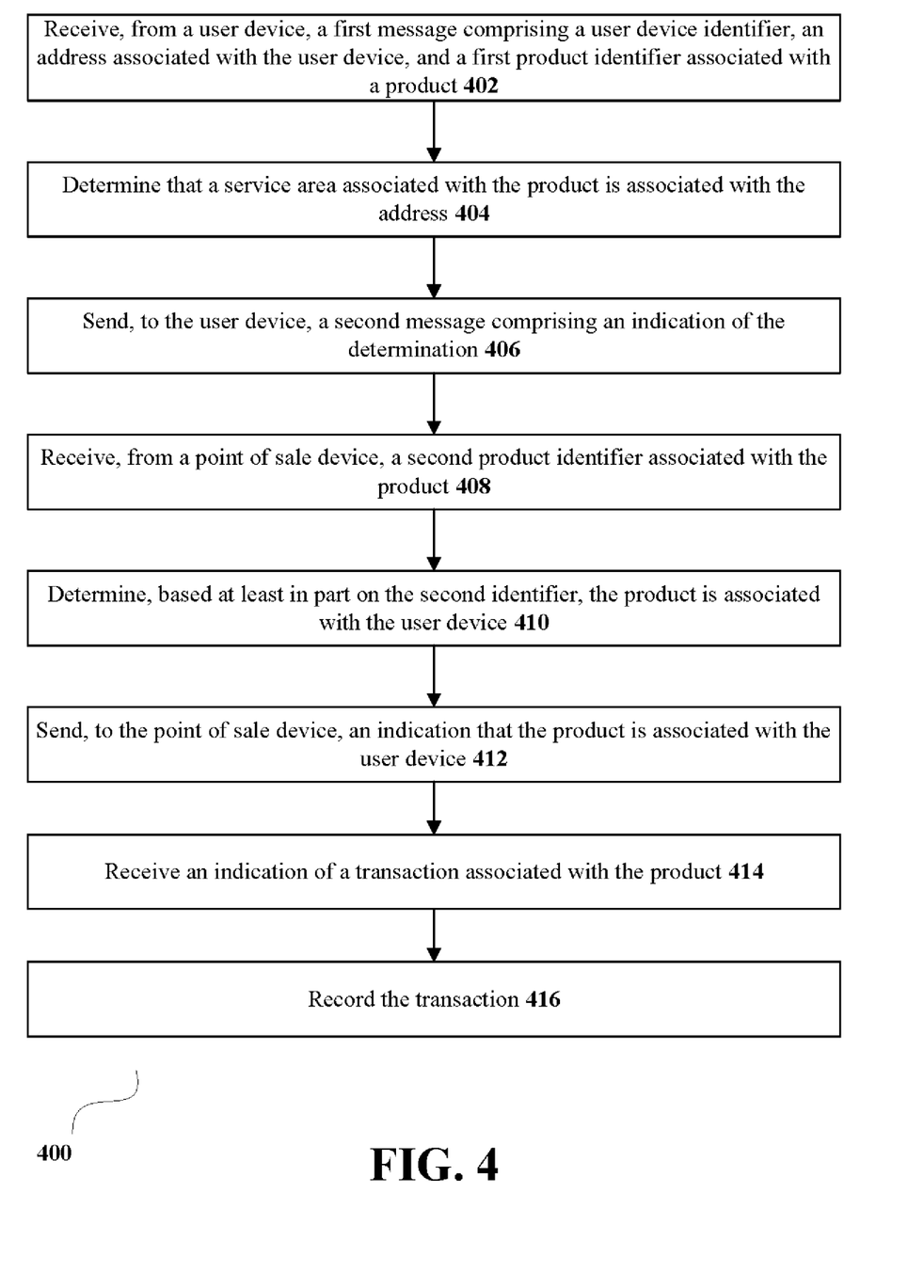
FIG. 4 shows an example method.

FIG. 4 shows an example method. The method of FIG. 4 may be used to process a pre-purchase serviceability check and authorization scheme to allow purchase of a product. The method of FIG. 4 may occur, at least in part, at a retail establishment. The method of FIG. 4 may occur, at least in part, at a central computing device monitoring pre-purchase serviceability checks and transactions. The method of FIG.

4 may take place, at least in part, using a point of sale system associated with a third party entity, such as a third party retail establishment. At step 402, a computing device may receive, from a user device, a first message comprising a user device identifier, an address associated with the user device, and a first product identifier associated with a product. The user device identifier may comprise a phone number associated with the user device, a MAC address of the user device, a unique identifier of the user device, a profile identifier of the user device, or any other unique identifier associated with the user device. The address associated with the user device may be associated with a residence or a business location of a user associated with the user device. The first product identifier associated with the product may comprise a six-digit number. The first product identifier may comprise a six-digit alphanumeric sequence. The first product identifier may be longer or shorter than six-digits. The first product identifier may comprise any unique or pseudo-unique sequence. Based on receiving the user device identifier, the address, and the first product identifier, the computing device may determine a request to perform a serviceability check. For example, the serviceability check may be performed prior to purchasing a product. The product may have a restriction. For example, the product may comprise a pre-packaged home internet kit. The home internet kit may be acquired at a third party location, and it may not be clear whether the home internet kit may be usable at the address associated with the user device. Therefore, the serviceability check may determine whether the product is serviceable at the address prior to a purchase of the product.

At step 404, the computing device may determine that a service area associated with the product is associated with the address associated with the user device. For example, the product may comprise a home internet starter kit. The computing device may determine whether internet associated with an ISP associated with the home internet starter kit services an area associated with the address associated with the user device. The computing device may determine the address is invalid. For example, the computing device may determine the address is outside a geographic area associated with a service area of the ISP. The computing device may determine the address is valid. For example, the computing device may determine the address is associated with a geographic area associated with internet provided by an ISP associated with the home internet starter kit.

At step 406 the computing device may send, to the user device, a second message comprising an indication of the determination. For example, the computing device may determine that the service area associated with the product is associated with the address associated with the user device. The second message may comprise an indication that that the product is serviceable at the address. The second message may comprise an indication that the user device may purchase the product. The second message may comprise an indication that the user device is authorized to purchase the product.

At step 408, the computing device may receive, from a point of sale device, a second product identifier associated with the product. For example, the point of sale device may send a request to the computing device indicating a pending transaction and the second product identifier. The computing device may receive a request from the point of sale device indicating one or more of the user device identifier or the address associated with the user device, in addition to the second product identifier. The computing device may search a database associated with the computing device for an indication of the second product identifier. The computing device may determine an indication of the second product identifier in the database, and the computing device may determine the second product identifier is associated with at least one of the user device identifier, the address associated with the user device, or the first product identifier. The system may determine a validity of a serviceability check associated with the second product identifier.

The second product identifier may comprise a virtual account number. The second product identifier may be associated with an individual product. The second product identifier may be unique. For example, the second product identifier may comprise a 19-digit virtual account number. The second product identifier may comprise a 19-digit numeric sequence. The second product identifier may comprise a 19-digit alphanumeric sequence. The second product identifier may be longer or shorter than 19 digits. The second product identifier may be associated with a unique product. The second product identifier may be printed on a package associated with a product. The second product identifier may be printed on a product. The second product identifier may comprise a barcode. The second product identifier may comprise a portion of a barcode. The computing device may receive serviceability checks associated with any number of products. The computing device may comprise a database. The database may store indications associated with a plurality of virtual account numbers, including the second product identifier. Each one of the plurality of virtual account numbers may be unique, and each one of the plurality of virtual account numbers may be associated with an individual product.

At step 410, the computing device may determine, based at least in part on the second product identifier, the product is associated with the user device. The computing device may determine that the product is associated with the user device for a first period of time. The product may be offered for sale, and the computing device may determine that the user device, or a user associated with the user device, may purchase the product for the first period of time. The computing device may determine the product is associated with at least one of a user device identifier, an address associated with the user device, or the first product identifier. The computing device may, in response to determining the product is associated with the user device, store an indication that the product is associated with the user device in a database associated with the computing device.

At step 412, the computing device may send, to the point of sale device, an indication that the product is associated with the user device. For example, the computing device may send an indication to the point of sale device that the user device completed a valid serviceability check associated with the product and the user device is authorized to purchase the product. The computing device may send an indication to the point of sale device that the product is serviceable at the address associated with the user device.

The computing device may further send the point of sale device an indication that the user device is associated with the product for the first period of time. The computing device may indicate, to the point of sale device, that the user device is disassociated with the product during times outside of the first period of time.

At step 414, the computing device may receive an indication of a transaction associated with the product. The computing device may receive the indication from the point of sale device. The point of sale device may indicate that the point of sale device processed the transaction. The indication of the transaction may be received from a device other than the point of sale device. The indication of the transaction may indicate that the transaction was processed by a device different than the point of sale device. The indication of the transaction associated with the product may comprise at least one of the first product identifier, the second product identifier, the user device identifier, or the address associated with the user device.

At step 416, the computing device may record the transaction. For example, the computing device may record the transaction at a database associated with the computing device. The transaction may be recorded in association with the virtual account number associated with the product. The computing device may determine the product is no longer presented for sale. In response to determining the transaction, the first device identifier may be disassociated from the product. The first device identifier may be associated with a second product presented for sale. The virtual account number may remain associated with the product. The computing device may record, along with the indication of the transaction, at least one of an indication of the user device identifier, the address associated with the user device, the virtual account number, or the first product identifier.

Figure 5:
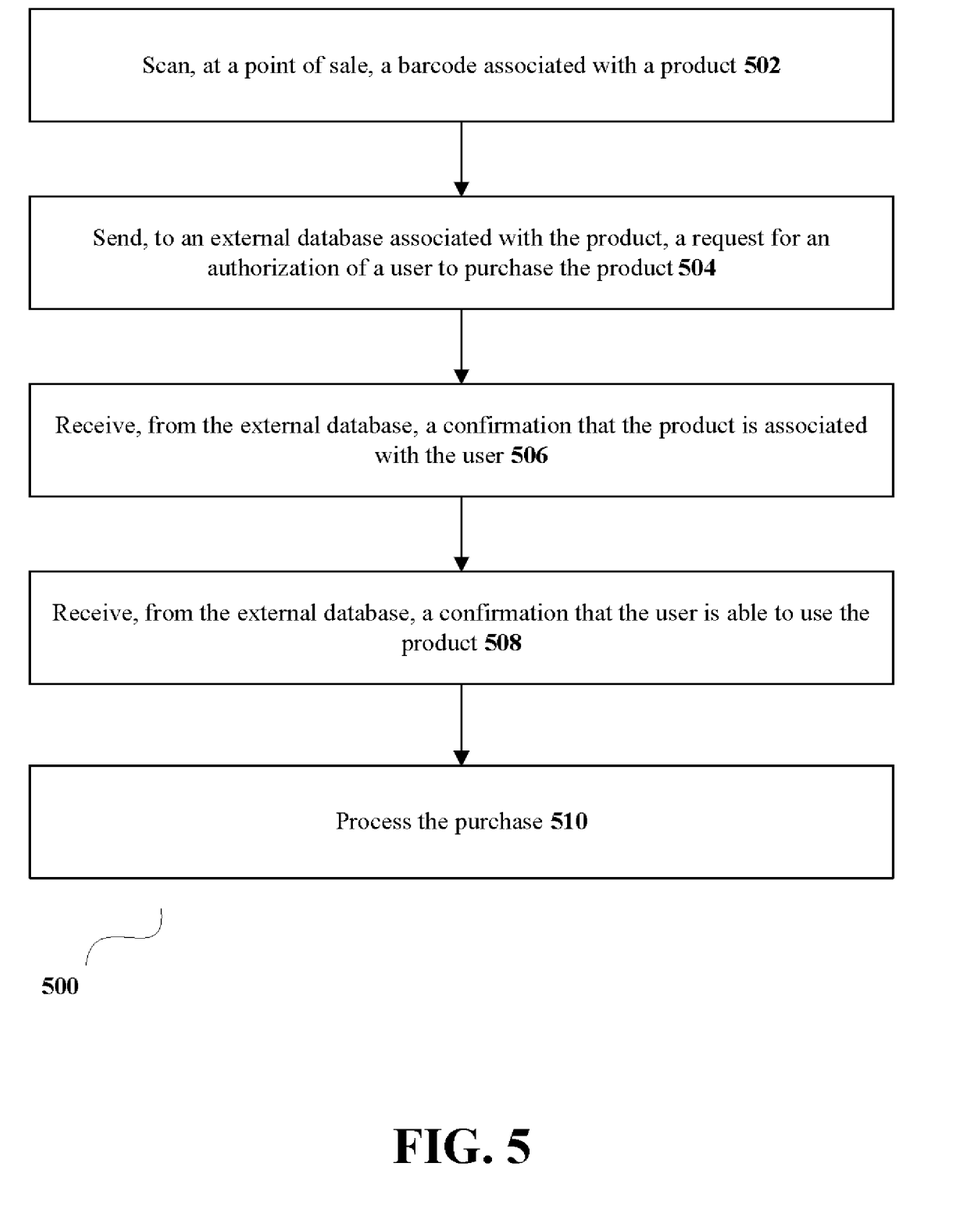
FIG. 5 shows an example method.

FIG. 5 shows an example method. The method of FIG. 5 may be used to process a transaction of a product, the transaction comprising confirming a valid serviceability check and pre-purchase authorization of the product to be purchased. The method of FIG. 5 may occur, at least in part, at a retail establishment. The method of FIG. 5 may occur, at least in part, at a point of sale at a retail establishment. The method of FIG. 5 may occur, at least in part, by a point of sale device. The method of FIG. 5 may occur, at least in part, by a computing device located at a location different than the location of the transaction. At step 502, a device scans, at a point of sale, a barcode associated with a product. The barcode may comprise a static barcode. A static barcode may comprise a same barcode for each individual product of a type of product. The barcode may comprise a dynamic barcode. A dynamic barcode may be different for each individual product. The barcode may comprise multiple portions. At least one portion of the barcode may be associated with the device associated with the point of sale. For example, the first portion of the barcode may comprise a stock-keeping unit associated with the type of product. The barcode may comprise a second portion. The second portion of the barcode may comprise a unique identifier associated with an individual product. The second portion of the barcode may comprise a virtual account number. The second portion of the barcode may comprise a 19-digit virtual account number. The second portion of the barcode may comprise a 19-digit numeric sequence. The second portion of the barcode may comprise a 19-digit alphanumeric sequence. The second portion of the barcode may be longer or shorter than 19 digits. The second portion of the barcode may be printed on a package associated with a product. The second portion of the barcode may be printed on a product.

At step 504, the device may send, to an external database associated with the product, a request for an authorization for a user to purchase the product. For example, the point of sale device may send, to the external database, the request for an outcome of a serviceability check associated with the user and the product. The point of sale device may be authorized to sell the product while the product is associated with a valid serviceability check. For example, a user associated with the product may be required to complete a serviceability check to be able to purchase the product. The point of sale device may request a virtual account number associated with the product, and the point of sale device may request whether the user is associated with the virtual account number.

At step 506, the device may receive, from the external database, a confirmation that the product is associated with the user. For example, the point of sale device may receive an indication from the external database that the user is associated with the virtual account number associated with the product. The confirmation from the external database may indicate the user completed a pre-purchase serviceability check associated with the product. The point of sale may process the transaction upon determining the user is associated with the product. Alternatively, the point of sale device may receive an indication from the external database that the user is disassociated with the product. For example, a valid serviceability check may remain valid for a first period of time. The first period of time may comprise 2 hours. The user may attempt to purchase the product outside of the 2 hour serviceability check validity time. The external database may determine a valid serviceability check associated with the user and associated with the product, but the external database may determine the serviceability check is outside a valid time. Accordingly, the external database may send, to the point of sale device, an indication that the user is disassociated with the product. Upon receiving a determination of an invalid serviceability check associated with the user and the product, the point of sale device may decline to process a purchase of the product by the user.

At step 508, the device may receive, from the external database, a confirmation that the user is able to use the product. For example, the user may attempt to purchase a home internet starter kit. However, not all geographic location may support the home internet starter kit. For example, an area outside of a service area of an ISP associated with the home internet starter kit may be unable to use the home internet starter kit. Thus, a user may be requested to conduct a pre-purchase serviceability check prior to purchasing the home internet starter kit from a store. The external database may be associated with a company associated with the product. The point of sale may receive the indication that the user is able to use the product. The indication may indicate that the user is associated with a valid serviceability check.

At step 510, the device may process the purchase. The device may comprise a point of sale device, and the point of sale device may process the purchase at a store associated with the point of sale device. Upon processing the purchase, the point of sale device may provide information or indications regarding the purchase to the external database. For example, upon completion of the purchase, the point of sale device may transmit, to the external database, an indication of the completion of the purchase and an indication of the product. The point of sale device may transmit the indication of the completion of the purchase and an indication of the user associated with the purchase. For example, the point of sale device may transmit, to the external database, an address associated with the user, a device identifier associated with a user device of the user, or a first product identifier associated with the product and associated with the serviceability check.

Figure 6:
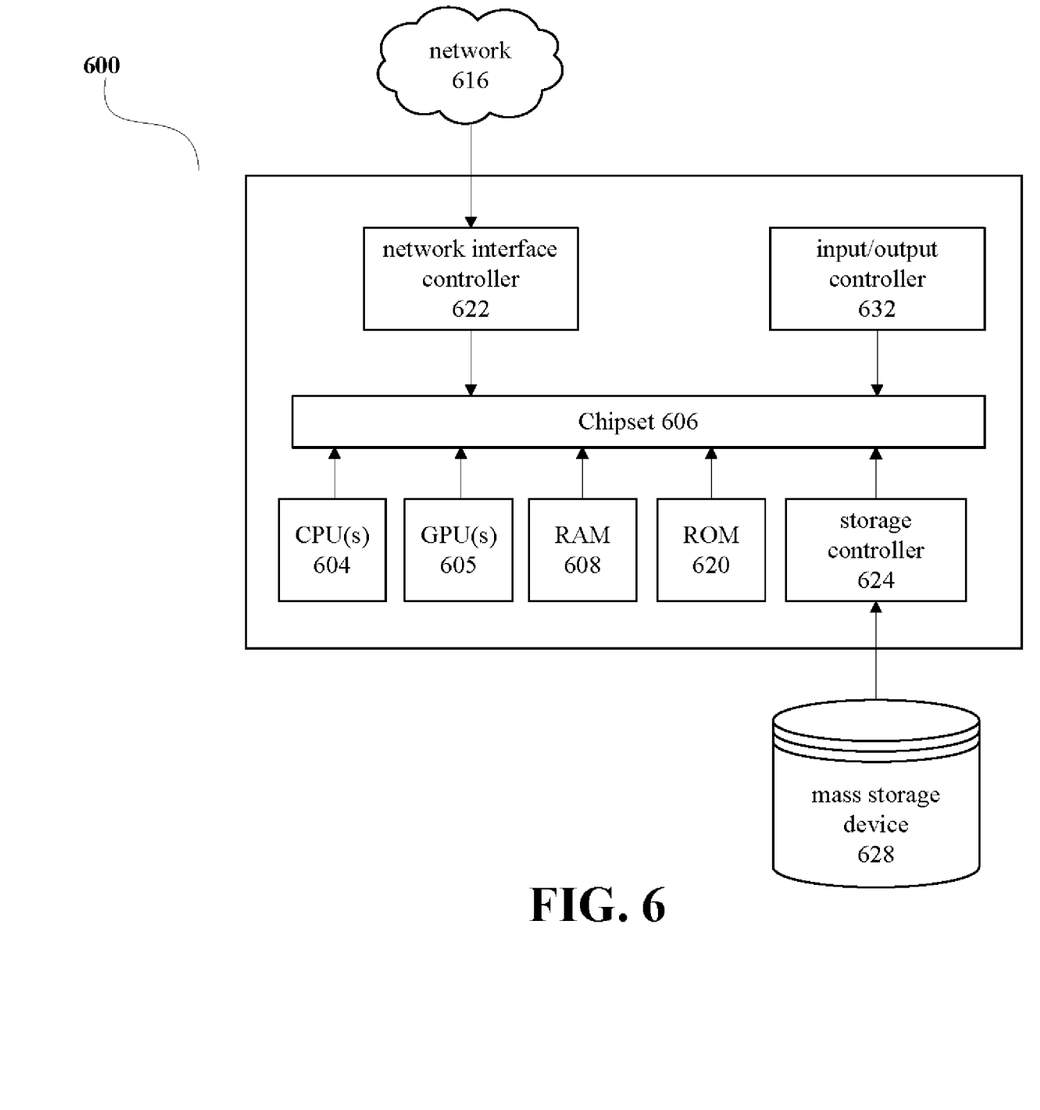
FIG. 6 shows an example computing system.

FIG. 6 shows an example computing device 600 that may represent any of the various devices or entities shown in FIG. 1, including, for example, the network 102, the user device 116, the point of sale 118, or the prepaid application database 104. That is, the computing device 600 shown in FIG. 6 may comprise any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIG. 1 or any of the methods described in relation to FIGS. 3-5.

The computing device 600 may comprise a baseboard, or "motherboard," which is a printed circuit board to which a multitude of components or devices may be connected by way of a system bus or other electrical communication paths. One or more central processing units (CPUs or "processors") 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, or the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random-access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems of the system 100. The chipset 606 may comprise functionality for providing network connectivity through a network interface controller (NIC) 622. A NIC 622 may be capable of connecting the computing device 600 to other computing nodes over the system 100. It should be appreciated that multiple NICs 622 may be present in the computing device 600, connecting the computing device to other types of networks and remote computer systems. The NIC 622 may be configured to implement a wired local area network technology, such as IEEE 802.3 ("Ethernet") or the like. The NIC 622 may also comprise any suitable wireless network interface controller capable of wirelessly connecting and communicating with other devices or computing nodes on the system 100. For example, the NIC 622 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 600 may be connected to a mass storage device 628 that provides non-volatile storage (i.e., memory) for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 628 is characterized as primary or secondary storage or the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may comprise volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 3-5.

A computing device, such as the computing device 600 depicted in FIG. 6, may also comprise an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not comprise all of the components shown in FIG. 6, may comprise other components that are not explicitly shown in FIG. 6, or may utilize an architecture completely different than that shown in FIG. 6.

As described herein, a computing device may be a physical computing device, such as the computing device 600 of FIG. 6. A computing device may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is not intended to be limiting.

As used in the specification and the appended claims, the singular forms "a," "an," and "the" comprise plural referents unless the context clearly dictates otherwise. Ranges may be expressed herein as from "about" one particular value, and/or to "about" another particular value. When such a range is expressed, another example may comprise from the one particular value and/or to the other particular value. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of.". "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any combination of the described methods.

As will be appreciated by one skilled in the art, the methods and systems may take the form of entirely hardware, entirely software, or a combination of software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described above with reference to block diagrams and flowcharts of methods, systems, apparatuses, and computer program products. It will be understood that each block of the block diagrams and flowcharts, and combinations of blocks in the block diagrams and flowcharts, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added or removed. The example systems and components described herein may be configured differently than described. For example, elements may be added to, removed from, or rearranged.

It will also be appreciated that various items are shown as being stored in memory or on storage while being used, and that these items or portions thereof may be transferred between memory and other storage devices for purposes of memory management and data integrity. Alternatively, some or all of the software modules and/or systems may execute in memory on another device and communicate with the shown computing systems via inter-computer communication. Furthermore, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms. Accordingly, the present invention may be practiced with other computer system configurations.

While the methods and systems have been described in connection with specific examples, it is not intended that the scope be limited to the specific examples set forth.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including matters of logic with respect to arrangement of steps or operational flow and the plain meaning derived from grammatical organization or punctuation.

It will be apparent to those skilled in the art that various modifications and variations may be made without departing from the scope or spirit of the present disclosure. Alternatives will be apparent to those skilled in the art from consideration of the specification and practices described herein. It is intended that the specification and example figures be considered as exemplary only, with a true scope and spirit being indicated by the following claims.

What is claimed is:

1. A method comprising:
receiving a first message from a user device associated with a user, the message comprising:
information indicative of the user; and
a first identifier associated with a product;
determining, based on one or more of the information indicative of the user or the first identifier, that the product is usable by the user;
associating, for a first period of time, the first identifier with a second identifier associated with the product;
receiving, from a point of sale device, a request comprising the second identifier;
determining a time associated with the request from the point of sale device is within the first period of time; and
sending, to the point of sale device, a second message comprising an indication of the time being within the first period of time and an indication that the product is usable by the user.

2. The method of claim 1, wherein the information indicative of the user comprises one or more of a phone number associated with the user or an address associated with the user.

3. The method of claim 2, further comprising:
associating, in response to receiving the first message, one or more of the phone number, the address, or the first identifier with the second identifier.

4. The method of claim 1, wherein the second identifier is associated with at least a first portion of a barcode associated with the product.

5. The method of claim 1, further comprising:
determining the address is outside a service area associated with the product; and
sending, to the user, an indication that the user is unauthorized to purchase the product.

6. The method of claim 1, wherein the request received from the point of sale device is received outside the first period of time, further comprising sending, to the point of sale device, an indication that the user is not authorized to purchase the product.

7. The method of claim 1, further comprising sending, to the point of sale device, an indication that the user is authorized to purchase the product.

8. The method of claim 1, further comprising:
receiving, from the point of sale device, an indication of a transaction associated with the user and the product;
removing the association between the first identifier and the product; and
associating a second product with the first identifier.

9. A device comprising:
one or more processors; and
memory storing instructions that, when executed by the one or more processors, cause the device to:
receive a first message from a user device associated with a user, the message comprising:
information indicative of the user; and
a first identifier associated with a product;
determine, based on one or more of the information indicative of the user or the first identifier, that the product is usable by the user;
associate, for a first period of time, the first identifier with a second identifier associated with the product;
receive, from a point of sale device, a request comprising the second identifier;

determine a time associated with the request from the point of sale device is within the first period of time; and send, to the point of sale device, a second message comprising an indication of the time being within the first period of time and an indication that the product is usable by the user.

10. The device of claim 9, wherein the information indicative of the user comprises one or more of a phone number associated with the user or an address associated with the user, and wherein the instructions, when executed further cause the device to associate, in response to receiving the first message, one or more of the phone number, the address, or the first identifier with the second identifier.

11. The device of claim 9, wherein the second identifier is associated with at least a first portion of a barcode associated with the product.

12. The device of claim 9, wherein the instructions, when executed, further cause the device to:
determine the address is outside a service area associated with the product; and
send, to the user, an indication that the user is unauthorized to purchase the product.

13. The device of claim 9, wherein the request received from the point of sale device is received outside the first period of time, and wherein the instructions, when executed, further cause the device to send, to the point of sale device, an indication that the user is not authorized to purchase the product.

14. The device of claim 9, wherein the instructions, when executed, further cause the device to:
receive, from the point of sale device, an indication of a transaction associated with the user and the product;
remove the association between the first identifier and the product; and
associate a second product with the first identifier.

15. A non-transitory computer-readable medium storing instructions that, when executed, cause:
receiving a first message from a user device associated with a user, the message comprising:
information indicative of the user; and
a first identifier associated with a product;
determining, based on one or more of the information indicative of the user or the first identifier, that the product is usable by the user;
associating, for a first period of time, the first identifier with a second identifier associated with the product;
receiving, from a point of sale device, a request comprising the second identifier;
determining a time associated with the request from the point of sale device is within the first period of time; and
sending, to the point of sale device, a second message comprising an indication of the time being within the first period of time and an indication that the product is usable by the user.

16. The non-transitory computer-readable medium of claim 15, wherein the information indicative of the user comprises one or more of a phone number associated with the user or an address associated with the user, and wherein the instructions, when executed further cause associating, in response to receiving the first message, one or more of the phone number, the address, or the first identifier with the second identifier.

17. The non-transitory computer-readable medium of claim 15, wherein the second identifier is associated with at least a first portion of a barcode associated with the product.

18. The non-transitory computer-readable medium of claim 15, wherein the instructions, when executed, further cause:
determining the address is outside a service area associated with the product; and
sending, to the user, an indication that the user is unauthorized to purchase the product.

19. The non-transitory computer-readable medium of claim 15, wherein the request received from the point of sale device is received outside the first period of time, and wherein the instructions, when executed, further cause sending, to the point of sale device, an indication that the user is not authorized to purchase the product.

20. The non-transitory computer-readable medium of claim 15, wherein the instructions, when executed, further cause:
receiving, from the point of sale device, an indication of a transaction associated with the user and the product;
removing the association between the first identifier and the product; and
associating a second product with the first identifier.

* * * * *